(12) United States Patent
Alcorn et al.

(10) Patent No.: US 10,791,120 B2
(45) Date of Patent: Sep. 29, 2020

(54) SYSTEM AND METHOD FOR PROVIDING ACCESS TO SECURED DATA VIA A PUSH NOTIFICATION

(71) Applicant: LENOVO ENTERPRISE SOLUTIONS (SINGAPORE) PTE. LTD., Singapore (SG)

(72) Inventors: Matthew R. Alcorn, Durham, NC (US); James G. McLean, Raleigh, NC (US); Randall W. Worzella, Raleigh, NC (US); Antonio Abbondanzio, Raleigh, NC (US)

( * ) Notice: Subject to any disclaimer, the term of this patent is extended or adjusted under 35 U.S.C. 154(b) by 168 days.

(21) Appl. No.: 15/691,200

(22) Filed: Aug. 30, 2017

(65) Prior Publication Data

US 2019/0068605 A1 Feb. 28, 2019

(51) Int. Cl.
*H04L 29/06* (2006.01)
*H04L 29/08* (2006.01)
*H04W 12/00* (2009.01)

(52) U.S. Cl.
CPC .......... *H04L 63/102* (2013.01); *H04L 63/108* (2013.01); *H04L 67/26* (2013.01); *H04W 12/00502* (2019.01); *H04L 63/0428* (2013.01); *H04L 63/062* (2013.01); *H04L 63/0846* (2013.01)

(58) Field of Classification Search
CPC . H04L 63/102; H04L 63/108; H04L 63/0428; H04L 67/26; H04L 63/0846; H04L 63/062; H04W 12/00502
USPC .......................................................... 726/5
See application file for complete search history.

(56) References Cited

U.S. PATENT DOCUMENTS

| 7,743,404 | B1* | 6/2010 | Deutschmann | H04L 63/0815 709/225 |
| 9,819,648 | B1* | 11/2017 | Chilakapati | H04L 63/123 |
| 9,998,919 | B1* | 6/2018 | Marcus | H04W 12/06 |
| 2003/0061520 | A1* | 3/2003 | Zellers | H04L 63/083 726/5 |
| 2003/0096625 | A1* | 5/2003 | Lee | H04L 67/04 455/466 |
| 2004/0064730 | A1* | 4/2004 | Kamiyama | H04L 29/06 726/29 |
| 2004/0088349 | A1* | 5/2004 | Beck | H04L 63/0407 709/203 |
| 2005/0086527 | A1* | 4/2005 | Jackson | H04L 63/0428 726/4 |
| 2005/0160429 | A1* | 7/2005 | Hameleers | H04L 67/125 718/105 |

(Continued)

Primary Examiner — Aravind K Moorthy
(74) Attorney, Agent, or Firm — Kunzler Bean & Adamson; Bruce R. Needham

(57) ABSTRACT

The present disclosure relates to providing access to secured data from a system management appliance (SMA) and, more particularly, to a system and method of providing access to secured data from a system management appliance (SMA) via a push notification mechanism. The method includes providing secured data to a server, from a system management appliance (SMA) that requires credentials necessary to obtain the secured data; and providing a push notification to a device of a user, which advises the user of the secure data stored in the server and provides temporary access information to the server without the need for the user to provide the credentials otherwise necessary needed to obtain the secured data directly from the SMA.

19 Claims, 6 Drawing Sheets

(56) References Cited

U.S. PATENT DOCUMENTS

| | | | |
|---|---|---|---|
| 2008/0028446 A1* | 1/2008 | Burgoyne | H04L 63/0428 726/6 |
| 2009/0217359 A1* | 8/2009 | Kikkawa | H04L 63/08 726/5 |
| 2010/0188266 A1* | 7/2010 | Judd | G08G 5/0013 340/945 |
| 2010/0211887 A1* | 8/2010 | Woollcombe | G06F 21/6209 715/751 |
| 2011/0055909 A1* | 3/2011 | Dowlatkhah | G06F 21/31 726/6 |
| 2011/0099120 A1* | 4/2011 | Grossman | G06Q 10/06 705/325 |
| 2012/0297466 A1* | 11/2012 | Li | G06F 21/10 726/7 |
| 2013/0263228 A1* | 10/2013 | Tsubaki | H04L 63/107 726/4 |
| 2013/0331070 A1* | 12/2013 | Aldecoa | H04W 4/02 455/414.1 |
| 2014/0075582 A1* | 3/2014 | Hierro | H04L 63/123 726/30 |
| 2014/0164535 A1* | 6/2014 | Lynch | H04L 51/08 709/206 |
| 2014/0270167 A1* | 9/2014 | Cureau | H04N 7/1675 380/201 |
| 2014/0280535 A1* | 9/2014 | Owens | H04L 67/14 709/204 |
| 2015/0089233 A1* | 3/2015 | Roth | H04L 9/3247 713/176 |
| 2015/0227989 A1* | 8/2015 | Chattopadhyay | G06Q 30/0282 705/317 |
| 2015/0350362 A1* | 12/2015 | Pollack | H04L 67/2861 709/217 |
| 2015/0365300 A1* | 12/2015 | Kruglick | H04L 67/34 715/738 |
| 2016/0014057 A1* | 1/2016 | Gudla | H04L 51/14 709/206 |
| 2016/0062992 A1* | 3/2016 | Chen | G06F 16/43 707/736 |
| 2016/0103801 A1* | 4/2016 | Bortz | H04L 67/2814 715/205 |
| 2016/0154616 A1* | 6/2016 | Hirata | G06F 3/1267 358/1.14 |
| 2016/0359849 A1* | 12/2016 | Nakajima | H04L 63/0853 |
| 2017/0054820 A1* | 2/2017 | Webber | H04L 67/22 |
| 2017/0093791 A1* | 3/2017 | Gwock | H04L 61/2007 |
| 2017/0093998 A1* | 3/2017 | McKay | H04L 67/26 |
| 2017/0126636 A1* | 5/2017 | Lor | H04L 63/107 |
| 2017/0126668 A1* | 5/2017 | Mahiddini | H04L 67/02 |
| 2017/0132909 A1* | 5/2017 | Rabb | G08B 25/008 |
| 2017/0134884 A1* | 5/2017 | Taborn | H04W 4/70 |
| 2017/0185753 A1* | 6/2017 | Yang | G06F 21/10 |
| 2017/0237600 A1* | 8/2017 | Patel | H04L 29/08693 455/452.2 |
| 2017/0272527 A1* | 9/2017 | Bader | H04L 67/26 |
| 2017/0329980 A1* | 11/2017 | Hu | G06F 21/606 |
| 2018/0007012 A1* | 1/2018 | Raban | H04L 63/0428 |
| 2018/0026879 A1* | 1/2018 | Aggarwal | H04L 67/2852 709/228 |
| 2018/0139215 A1* | 5/2018 | Neuvirth-Telem | H04L 67/02 |
| 2018/0205715 A1* | 7/2018 | Ingale | H04L 63/062 |
| 2018/0219867 A1* | 8/2018 | Patterson | H04L 63/108 |
| 2018/0309748 A1* | 10/2018 | Li | H04L 63/0815 |
| 2018/0359369 A1* | 12/2018 | Golshenas | H04M 15/8214 |
| 2020/0092387 A1* | 3/2020 | Alcorn | H04L 43/045 |

\* cited by examiner

SYSTEM AND METHOD FOR PROVIDING ACCESS TO SECURED DATA VIA A PUSH NOTIFICATION

TECHNICAL FIELD

The present disclosure relates to providing access to secured data from a system management appliance (SMA) and, more particularly, to a system and method of providing access to secured data via a push notification mechanism.

BACKGROUND

Mobile applications have been used as solutions for system management. One advantage of such mobile applications is that alerts or other information from managed systems can be sent from System Management software to a mobile application in the form of a push notification.

Push notifications, though, are limited in size (e.g., 2 KB) and format, and are generally used as a summary of important information regarding an event, with the capability to launch an associated application to obtain detailed information regarding the event. However, in the case of a system management application or similar application, directly connecting to a target management server hosting the SMA, which is a high-security environment, may be difficult (where several additional security-related steps must be taken) or impossible (where a connection to the lab network or other high-security environment is not allowed or available).

For example, the current response of a user of a mobile device is to select the push notification to launch an application in the mobile device. In this arrangement, the application is effectively started up as if the user had selected it directly from the management system. This may require several prerequisite steps such as the establishment of a VPN, entering or re-confirming credentials, or other steps required to get to the high-security environment.

If this is not desirable or possible, the user must make do with information regarding the event provided in the push notification itself, which may be incomplete due to size and scope limitations of the push notification. For example, a system administrator may determine that access to an SMA needs to be shut down because of a security concern. Also, restrictions may be placed on access to information from the SMA when the user is outside of a certain geographic area, for example, when the user is in a foreign country. Also, different levels of access are often provided to users, and, in some instances, a user might not normally be permitted access to information related to an event identified in a push notification because the user does not have the required security clearance to access the information directly from the SMA.

As an example, consider an alert condition that is created on a server in a managed-hardware environment. The push notification itself provides an alert that a problem has occurred, but cannot convey detailed information (such as graphics or detailed event logs). In normal operation, the application has stored credentials for accessing the target elements from the SMA on a target management server. When a notification is received, the application can route to the target management server via a secured path to obtain more information using the same credentialing method that it would use when simply connecting to the SMA in the target management server in a standard user-initiated way. Generally, this is not a problem if the mobile device is on the same network or can access the SMA via a Virtual Private Network (VPN). However, in certain instances, such as noted above, this secured path is not available or requires too many extra steps for the user to easily obtain detailed information directly from the SMA in the target management server.

SUMMARY

In an aspect of the disclosure, a method includes providing secured data to a server, from a system management appliance (SMA) that requires credentials necessary to obtain the secured data; and providing a push notification to a device of a user, which advises the user of the secure data stored in the server and provides temporary access information to the server without the need for the user to provide the credentials otherwise necessary needed to obtain the secured data directly from the SMA.

In another aspect of the disclosure, a method includes transferring secured data related to a server for temporary storage, the secured data being transferred from a secure server associated with a system management appliance (SMA); and providing a push notification with URL information to a computing device, the URL information provides access to the secured data without requiring credentials necessary to obtain the secured data directly from the SMA.

In another aspect of the disclosure, a system includes a system management appliance (SMA) configured to provide secure data to a semi-secure server and to provide a user with a push notification advising the user of an event. The push notification includes temporary access information to the secured data, related to the event and stored by SMA in the semi-secure server, without requiring the user to provide credentials otherwise necessary to obtain the secured data directly from the SMA.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
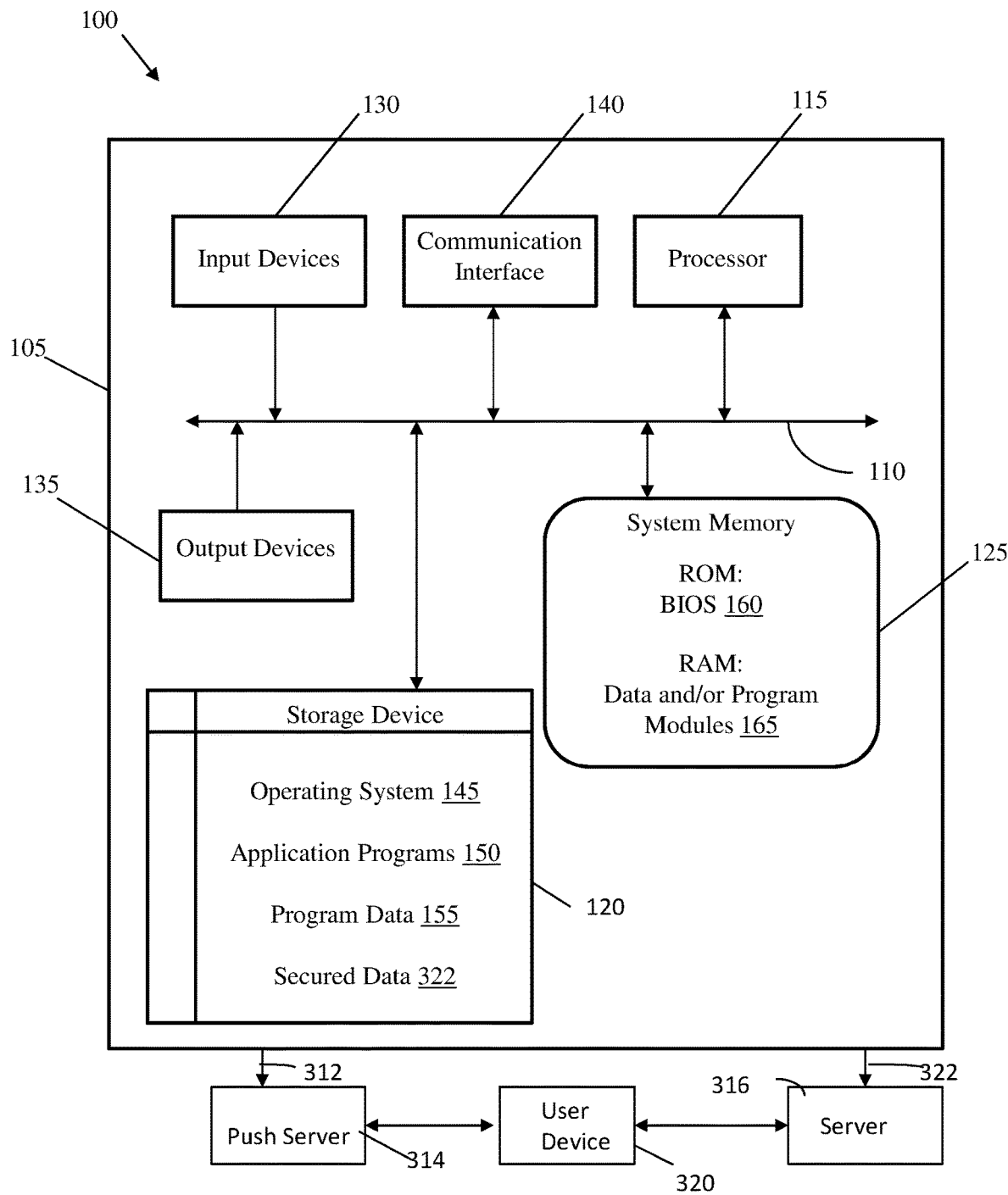
FIG. 1 is an illustrative architecture of a computing system in accordance with aspects of the present disclosure.

The present disclosure relates to providing access to secured data from a system management appliance (SMA) and, more particularly, to a system and method of providing access to secured data via a push notification mechanism. More particularly, the present disclosure relates to providing a user with a push notification, advising the user of an event, and allowing the user to access the event without accessing the SMA.

In embodiments, the push notification includes temporary access information to the secured data, which has been stored by a system management appliance (SMA) in a semi-secure server. In embodiments, the server in which the secured data is temporarily stored can be a server separate from a push server which provides the push notification to the user (e.g., a mobile device) or stored in the push server, itself. Among other advantages, the present disclosure provides the ability to obtain details on an event when access to the network containing the management server is restricted. For example the systems and methods described herein allow a mobile device to avoid normal firewalls around an SMA in order to obtain information without creating substantial security risks for the SMA. The systems and methods also provide the ability to: (i) obtain details of the event without going through access and authorization steps, (ii) provide details on a specific event without requiring or allowing access to the full system management software, (iii) forward details to another user without giving them authorization to access the full system management software, and (iv) make detailed information temporary so that secure information is not persistent on a third party server.

In embodiments, the origination of a push notification from a secure environment, such as a SMA, is combined with use of a less-secure environment used as temporary repository for detailed information associated with a push notification, along with the creation and use of a temporary address. In one example, an event causes both the push notification to be delivered to a user and the appropriate details, preferably as secured data, to be routed to a separate, semi-secure environment (e.g., a server) with a temporary address. Preferably, the push notification is delivered to a push server and routed to the mobile device at the same time the secured data is delivered to a server to be temporarily hosted.

In embodiments, the push notification includes information so that the user can access and derive secured data with fewer security restrictions or intermediate steps than would be necessary if the user attempts to access the secured data from the SMA, itself. Because the resource (e.g. URL/web page) created for the secured data in the semi-secure environment is temporary in nature, and only contains the details related to the specific event, allowing access to this semi-secure environment is much less risky than a full-rights login to the management program.

As described herein, implementations may be a system, a method, and/or a computer program product. The steps, methods and/or functionality disclosed herein can be implemented in any combination of hardware circuitry and software. The computer program product may include a computer readable storage medium (or media) having computer readable program instructions thereon for causing a processor to carry out aspects described herein. The computer readable storage medium (or media) includes, for example, non-transitory media such as flash memory, permanent memory such as read-only memory ("ROM"), semi-permanent memory such as random access memory ("RAM"), any other suitable type of storage component, or any combination thereof. Accordingly, the computer readable storage medium, as used herein, is not to be construed as being a transitory signal per se.

FIG. 1 is an illustrative architecture of a computing system in accordance with aspects described herein for implementing the SMA. The computing system 100 is only one example of a suitable computing system and is not intended to suggest any limitation as to the scope of use or functionality of aspects described herein. The computing system 100 includes a computing device 105. The computing device 105 can be resident on a network infrastructure such as within a cloud environment (shown in FIG. 2), or may be a separate independent computing device (e.g., a computing device of a third party service provider). As described herein, the computing device 105 may perform tasks (e.g., processes, steps, methods and/or functionality) in response to processor 115 executing program instructions contained in a computer readable storage medium, such as system memory 125. The program instructions may be read into system memory 125 from another computer readable storage medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the results of such tasks in accordance with aspects described herein.

The computing device 105 may include a bus 110, a processor 115, a storage device 120, a system memory (hardware device) 125, one or more input devices 130, one or more output devices 135, and a communication interface 140. In embodiments, the computing device 105 can be a secure server, e.g., management server hosting the SMA. The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations described herein, which may be operatively implemented by the computer readable program instructions.

For example, the processor 115 may execute one or more applications and/or program modules that provide a user with a push notification, advising the user of an event. The push notification includes temporary access information to secured data, related to the event, which has been stored by a system management appliance (SMA) in a server, without requiring the user to provide credentials necessary to obtain the secured data directly from the SMA. This allows a mobile device 320 to avoid normal firewalls around an SMA to obtain information without creating substantial security risks for the SMA. This also provides the ability to: (i) obtain details of the event without going through access and authorization steps, (ii) provide details on a specific event without requiring or allowing access to the full system management software, (iii) forward details to another user without giving them authorization to access the full system management software, and (iv) make detailed information temporary so that secure information is not persistent on another party server.

More specifically, in embodiments, data in the secure environment can be sent to a server 316 at the same time in which a push notification is sent to the user device (mobile device) 320 via, e.g., a push server 314. In embodiments, the push notification includes temporary access information to secured data 322 which has been provided to the semi-secure server 316. The secured data 322 is related to the event and does not require the user to provide credentials necessary to obtain the secured data 322 as would be necessary directly from the SMA. The secured data can be graphics, diagnostic information, field data, usage analytics, detailed log information or other data related to an event. The push notification 312 can include a URL as the temporary access information so that the mobile device 320 can access the secure data 322 from the sever 316, using the URL. Alternatively, the temporary access information can be a user ID/password, a temporary access code, a certificate or other form of temporary access information.

In embodiments, the URL provided with the push notification is temporary and self-destructs if the user does not take action after a given (selectable) period of time or other predefined occurrence. This temporary URL can be sent with the push notification in encrypted form. In addition, the temporary URL may be protected with an additional set of credentials, different than the credentials which would be required to access the secured data directly from the SMA. Also, the temporary URL is structured in such a way so as not to be predictable and not to allow for extrapolation for future uses. Further, the temporary URL may include graphics, detailed log information, or other information related to the event in the push notification, which is too large or complex for transmission in the push notification, itself. In other words, the temporary URL can be either provided in the push notification, itself, or sent in conjunction with the push notification. In an illustrative example, a server is managed by a system management software program such as Lenovo XClarity Administrator (LXCA). The management of the information can be done within the secure datacenter network environment, while the system administrator ("user") is without direct access to the datacenter network.

In operation, the address for the URL can be encoded in a push notification which is sent to the user's device along with an event summary. The user can access the data associated with the temporary URL directly from the push notification via a web browser (of the mobile device 320). In alternative embodiments, the push notification can trigger an application (either the primary mobile application for the systems management or an independent, purpose-specific application) which decodes and accesses the hosted data associated with the URL. In this way, the user can obtain details on the event in full rich-web format without having to provide full credentials to access the primary system management software. Accordingly, by implementing the systems and methods described herein, the computing system 100 may be configured to operate as a target management server to host a System Management Appliance (SMA) (see FIG. 3) to provide a user with a push notification 312.

Also, the computing device 105 can provide notifications regarding errors which occur within the managed network. For example, when an error occurs on the server, an alert is logged on the systems management software. The details related to the particular failure on the particular server are formatted (including appropriate graphics, detailed logs, etc.) and are sent to the temporary web server where they are placed in a location associated with a temporary URL, as described herein.

Still referring to FIG. 1, in embodiments, processor 115 may receive input signals from one or more input devices 130 and/or drive output signals through one or more output devices 135. The input devices 130 may be, for example, a keyboard or touch sensitive user interface (UI). The output devices 135 can be, for example, any display device, printer, etc.

The storage device 120 may include removable/non-removable, volatile/non-volatile computer readable storage media, such as, but not limited to, non-transitory media such as magnetic and/or optical recording media and their corresponding drives. The drives and their associated computer readable storage media provide for storage of computer readable program instructions, data structures, program modules and other data for operation of computing device 105 in accordance with the different aspects described herein. In embodiments, storage device 120 may store operating system 145, application programs 150, and program data 155 that perform the processes described herein, in addition to the secure data 322.

The system memory 125 may include a computer readable storage medium, including for example, non-transitory media such as flash memory, permanent memory such as read-only memory ("ROM"), semi-permanent memory such as random access memory ("RAM"), any other suitable type of storage component, or any combination thereof. A computer readable storage medium, as used herein, is not to be construed as being a transitory signal per se. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

Figure 2:
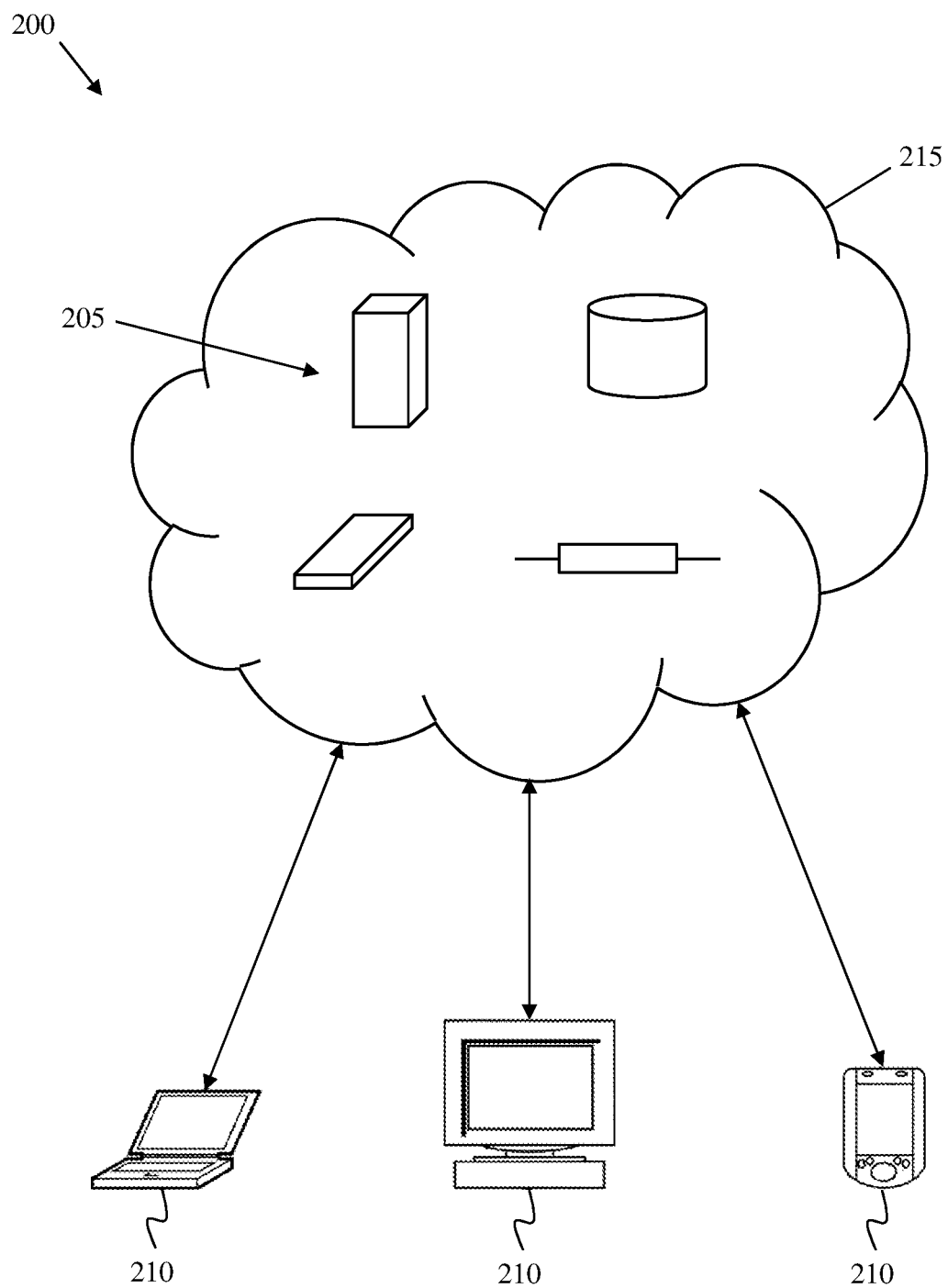
FIG. 2 shows an exemplary cloud computing environment in accordance with aspects of the present disclosure.

FIG. 2 shows an exemplary cloud computing environment 200 which can implement the processes and systems described herein. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200 including, e.g., push notifications and transfer and temporary storage of the secure data. Accordingly, it should be understood by those of ordinary skill in the art that the cloud resources 205 can include, e.g., push servers, secure servers and the SMA.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. In embodiments, as described herein, cloud resources 205 may include a software defined environment including a network management server that provide a user with a push notification, advising the user of an event, which push notification includes temporary access information to secured data, related to the event, which has been stored by a system management appliance (SMA) in a server, without requiring the user to provide credentials necessary to obtain the secured data directly from the SMA.

Cloud resources 205 may be on a single network or a distributed network. Cloud resources 205 may be distributed across multiple cloud computing systems and/or individual network enabled computing devices.

Client devices 210 may comprise any suitable type of network-enabled computing device, such as servers, desktop computers, laptop computers, handheld computers (e.g., smartphones, tablet computers), set top boxes, and network-enabled hard drives.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Figure 3:
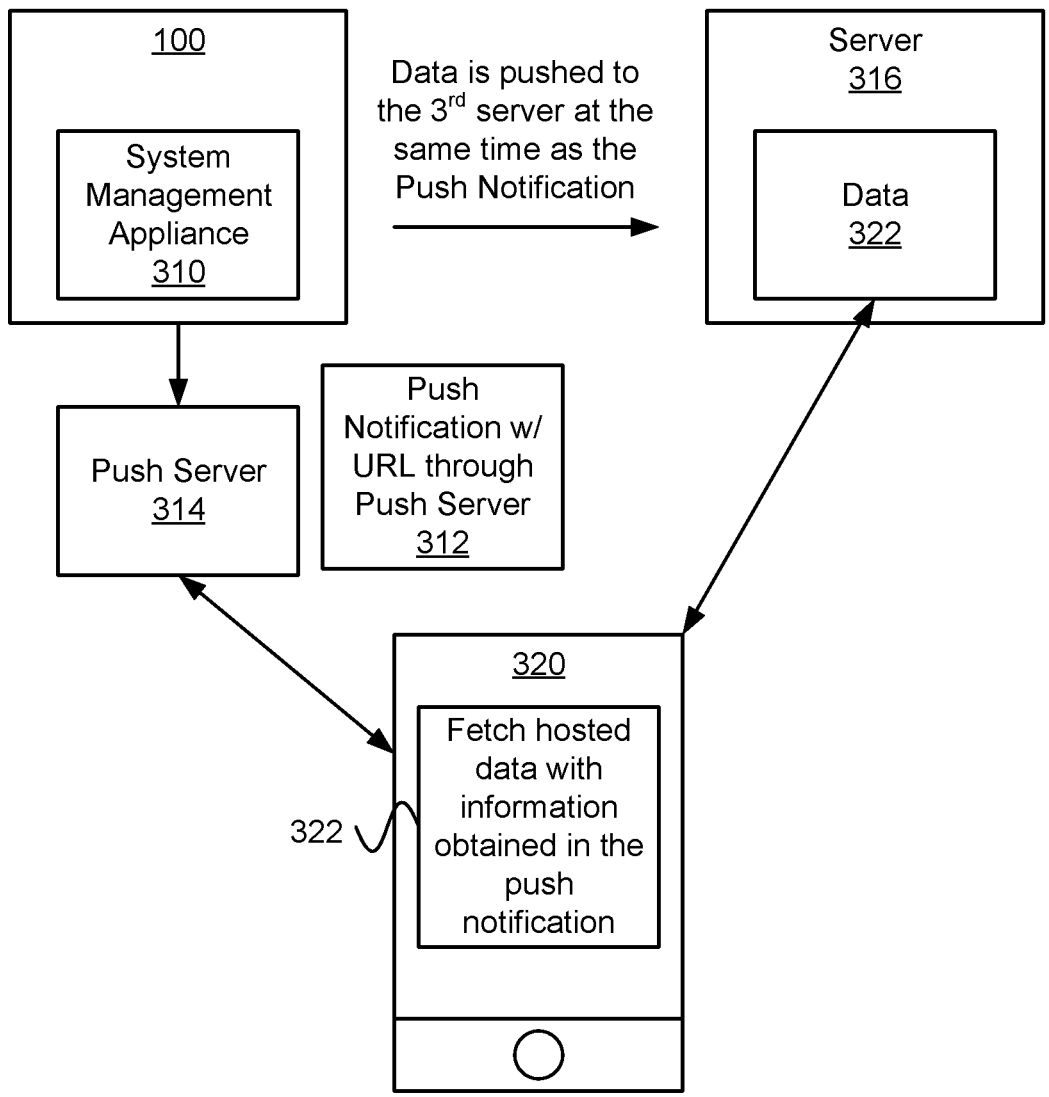
FIG. 3 shows a structure for providing access to secured data temporarily stored in a third party server in accordance with aspects of the present disclosure.

FIG. 3 shows an illustrative structure and processes in which a system management appliance (SMA) 310 hosted in a target management server 100 provides a push notification 312 to a push server 314, amongst other features. As discussed above, the target management server 100 can be the computing system 100 such as shown in FIG. 1. In embodiments, the push server 314 receives the push notification 312 from the target management server 100, e.g., SMA 310, and then provides the push notification 312 to a user (e.g., mobile device 320). The SMA 310 also provides secure data 322 to server 316, preferably at the same time it provides the push notification 312 to the push server 314. The secured data is temporarily stored in the server 316 as data 322. As discussed above, the hosted data 322, which can be in the form of a website, can be accessed by the mobile device 320 using the access information, e.g., URL, provided with the push notification 312. This enables the mobile device 320 to fetch and store the data 322. The data 322 will include the detailed information of the secured data 322 stored in the server 316.

Figure 4:
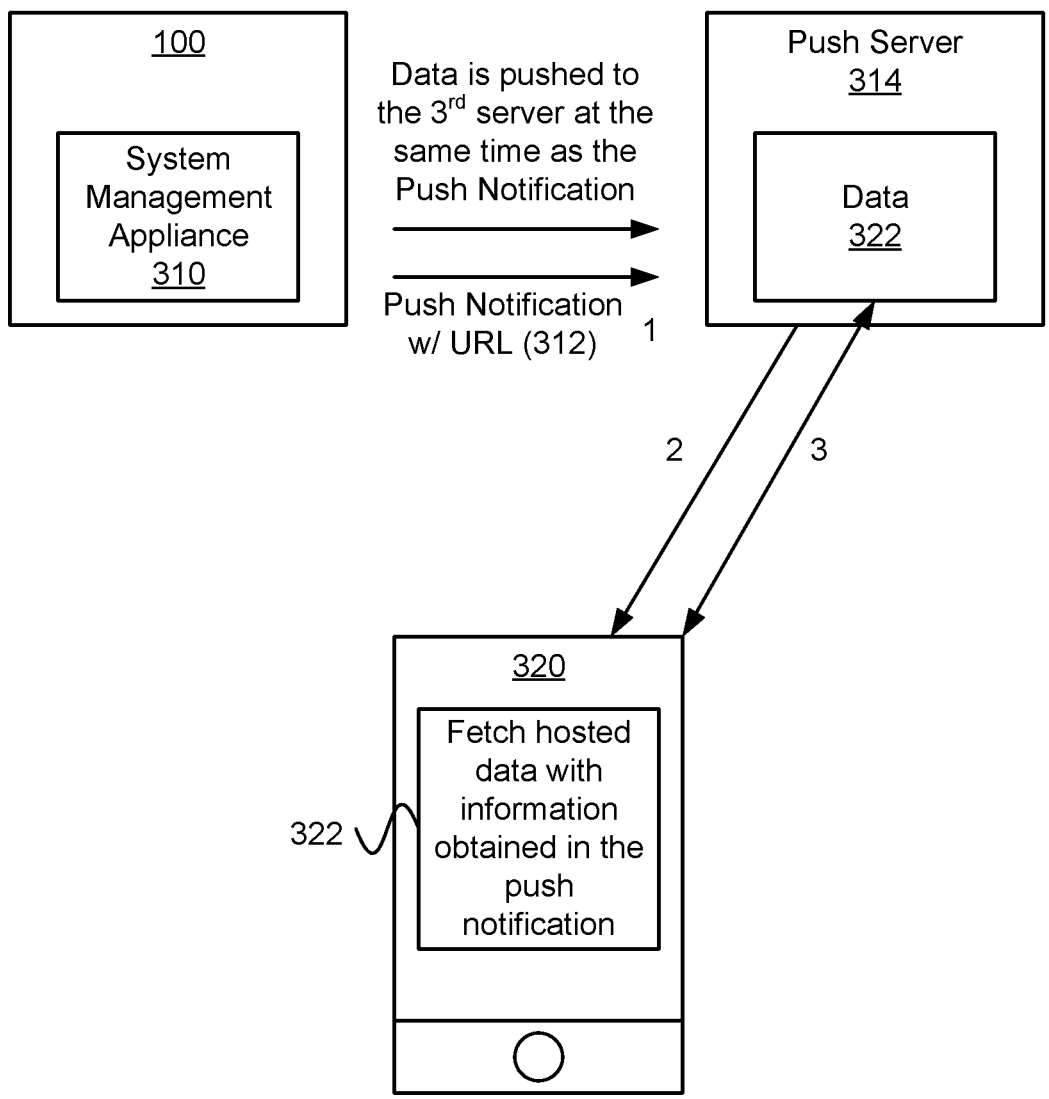
FIG. 4 shows a structure for providing access to secured data temporarily stored in a server in accordance with aspects of the present disclosure.

As shown in FIG. 4, the semi-secure environment may be the push notification server 314, rather than in a separate server. More specifically, in this instance both the secured data 322 and the push notification 312 are pushed from the SMA 310 to the push server 314. The secured data 322 and the push notification 312 can be pushed from the SMA 310 to the push server 314 at the same time or at different times, for example, pushing the push notification 312 before or after the secured data 322 is pushed. In this embodiment, the secured data 322 and push notification 312 stored in the push server 314 can be accessed directly from the user's mobile device 320. For example, based upon the URL information provided with the push notification 312, the data 322 can be accessed by the user mobile device 320. This fetched data 322 can be stored in the user mobile device 320.

The embodiment shown in FIG. 4 has advantages as it is capable of receiving information directly from the system management software. In this way, there is less security exposure since the detailed information (both the push notification and the secure data) does not need to be transmitted to any other server. The temporary URL thus created may also include mechanisms to take corrective action, where this action is more limited in scope, impact, and authorized duration than would be allowed with a full log-in procedure to the SMA.

Figure 5:
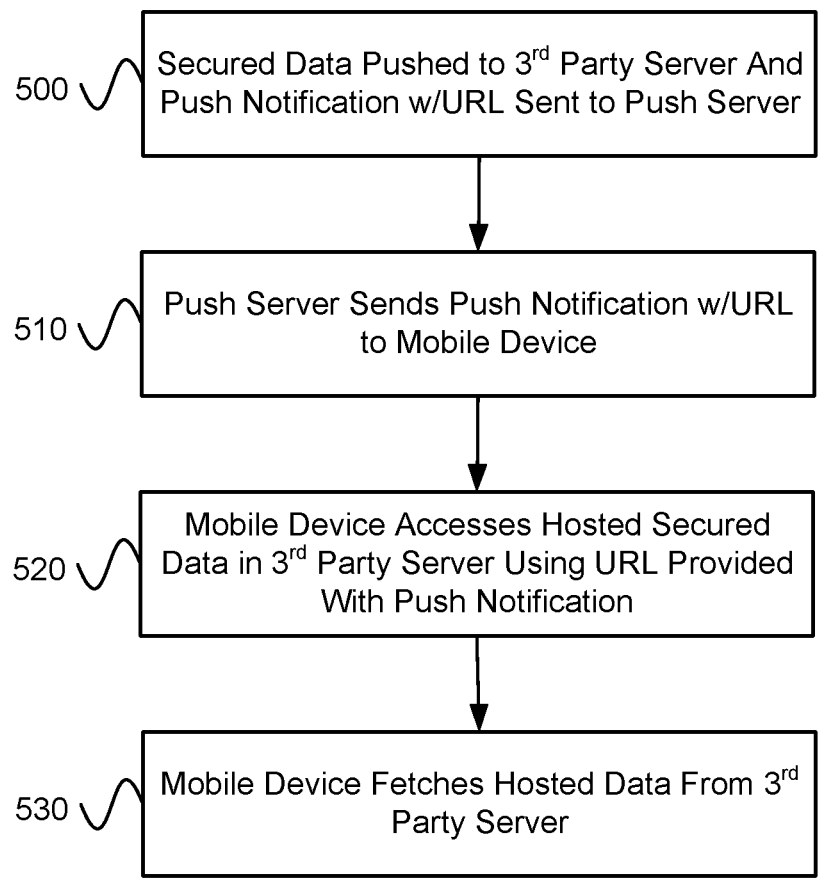
FIG. 5 shows a flowchart of steps for accessing secured data temporarily stored in a third party server in accordance with aspects of the present disclosure.

FIG. 5 shows a flowchart of steps for providing access to secured data regarding an event provided from a SMA via a push notification. This process does not require the user to provide credentials normally required to access the secured data directly from the SMA. In step 500, the SMA pushes secured data regarding an event to the third-party server and also sends a push notification with URL information for accessing the secured data to a push server. The data can be sent to the third-party server by the SMA at the same time as the push notification with the URL access information is sent to the push server. Alternatively, the secured data can be sent either before or after the push notification, with the URL access information being sent to the push server 314.

In step 510, the push server sends the push notification with the URL access information to the mobile device. In step 520, the mobile device accesses the hosted secured data in the third-party server using the URL access information provided with the push notification. In step 530, the user device fetches the hosted data from the third-party and stores the fetched hosted data in the user device 320.

Figure 6:
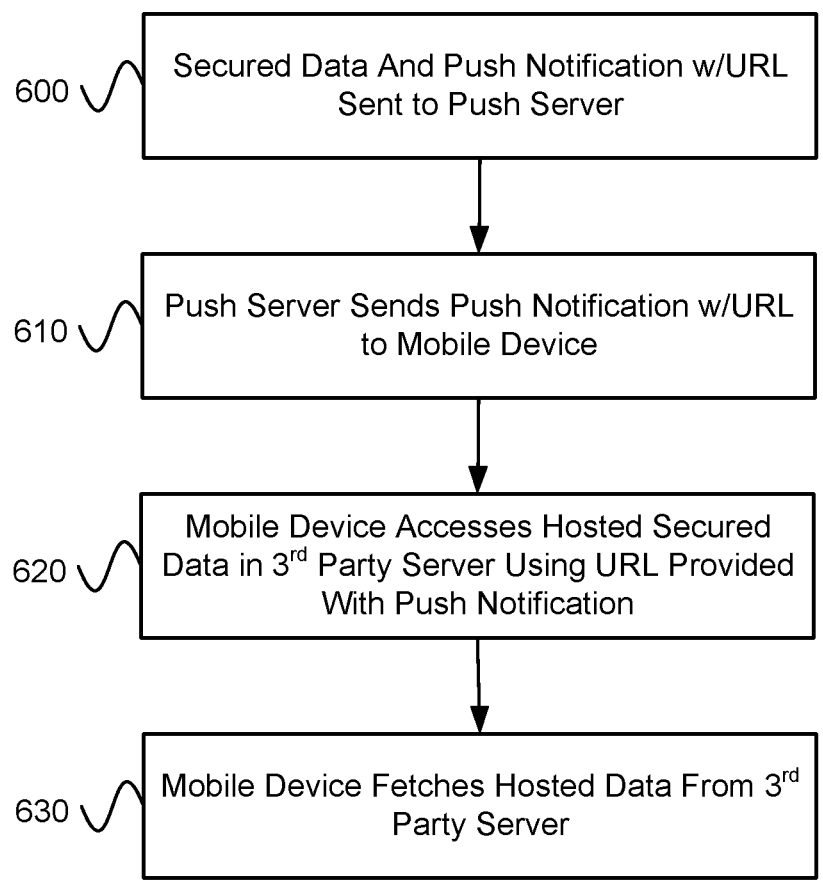
FIG. 6 shows a flowchart of steps for accessing secured data temporarily stored in a push server in accordance with aspects of the present disclosure.

FIG. 6 shows a flowchart for providing access to secured data regarding an event provided from a SMA via a push notification. Again, in this process, there is no requirement that the user to provide credentials normally necessary to access the secured data directly from the SMA. In step 600, the SMA pushes both the secured data regarding an event and a push notification with URL access information for accessing the secured data to a push server. The data can be sent to the push server by the SMA at the same time as the push notification with the URL access information is sent to the push server. Alternatively, the secured data can be sent either before or after the push notification with the URL access information is sent to the push server.

In step 610, the push server sends the push notification with the URL access information to the user device 320. In step 620, the user device accesses the hosted secured data in the third-party server using the URL access information provided with the push notification. In step 630, the user device fetches the hosted data from the third-party to store as fetched hosted data in the user device 320.

In an additional embodiment, the temporary URL access information included in the push notification may also include mechanisms to take corrective action, where this action is more limited in scope, impact, and authorized duration than would be allowed with a full log-in to the system management program. This includes, for example, allowing a user to take minor corrective actions for the individual user which will not adversely affect either the SMA or other users of the SMA.

The periods of time during which the temporary URL access information included in the push notification and the temporarily hosted secured data are valid may be variable depending on the severity, sensitivity, or source of the triggering event. Thus, simple information alerts may be kept for a longer period of time (befitting their less-urgent status), while critical alerts may be removed after a short while (since they represent a more significant security exposure if the address is hacked). With further regard to the periods of time during which the temporary access information and the temporarily hosted secured data are valid, the temporary access information and/or the temporarily hosted secured data can be destroyed if the user does not take action within a period of time set by the SMA, or allowed to expire after a set amount of time or after a number of invalid access attempts exceeds a predetermined threshold, or deleted after the temporary access information and/or the temporarily hosted secured data has been accessed more than a predetermined number of times.

The available actions described above may also be time-limited and those time limits may be independent of the information aspects. Put another way, the user may still be able to see the details stored as the hosted secured data in either the third party server or the push server after the opportunity to directly take action has expired. It is also possible to impose additional restrictions on access by the mobile device to the temporarily hosted secured data in the third-party server for the push server. For example, access to this temporarily hosted secured data can be limited to mobile devices in certain geographic areas, or to certain days and times.

Although the above discussion focuses on a system management scenario, the same mechanisms described herein could be used in a wide variety of other scenarios where, as an alternative to full access to a high-security environment, a limited set of information can be sent to a less-secure environment for a limited time with the access information transmitted to the user as described. For example, in research programs or defense systems where a large number of users are granted varying degrees of access to centralized information based upon the level of their security clearance, users with lower levels of security clearance can temporarily be granted access to information which is necessary for them to conduct their research or take emergency action, even though these users would not normally be granted such access to this type of information.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
    providing secured data to a server, from a system management appliance (SMA) hosted in a secure server that requires credentials necessary to obtain the secured data from the SMA; and
    providing a push notification to a device of a user, which advises the user of the secure data stored in the server and provides temporary access information to the server to allow the user to obtain the secured data from the server without the need for the user to provide the credentials otherwise necessary to obtain the secured data directly from the SMA hosted in the secure server, wherein the temporary access information comprises a link to the secured data for temporary access to the secured data, wherein the secured data is temporarily stored in the server, and the push notification allows the user to obtain the secured data from the server while avoiding firewalls around the SMA in the secure server.

2. The method of claim 1, wherein the temporary access information comprises at least one of a temporary universal resource locator (URL), a user ID/password, a temporary access code and/or a certificate.

3. The method of claim 2, further comprising:
    destroying the temporary access information and/or the temporarily hosted secured data if the user does not take action within a period of time set by the SMA;
    allowing the temporary access information and/or the temporarily hosted secured data to expire after a set amount of time or after a number of invalid access attempts exceed a predetermined threshold; and/or
    deleting the temporary access information and/or the temporarily hosted secured data after it has been accessed more than a predetermined number of times.

4. The method of claim 2, wherein the temporary URL is sent with the push notification in encrypted form.

5. The method of claim 2, wherein the temporary URL is protected with credentials different from credentials necessary to obtain the secured data directly from the SMA.

6. The method of claim 2, wherein the temporary URL includes information related to an event indicated in the push notification.

7. The method of claim 2, wherein information included in the temporary URL related to an event includes at least one of graphics and detailed log information.

8. The method of claim 1, wherein the server is a push server which also sends the push notification to the device of the user.

9. The method of claim 1, wherein the server is a semi-secure server.

10. The method of claim 9, wherein the SMA sends the push notification to a push server simultaneously with sending the secured data to the server.

11. A method comprising:
    transferring secured data related to a server for temporary storage, the secured data being transferred from a secure server associated with a system management appliance (SMA); and
    providing a push notification with URL information to a computing device of a user, the push notification advising the user of the secured data and the URL information provides temporary access to the secured data in the server for temporary storage without requiring credentials necessary to obtain the secured data directly from the SMA in the source server, wherein the secured data is temporarily stored in the server, and the push notification allows the user to obtain the secured data from the server while avoiding firewalls around the SMA in the secure server.

12. The method of claim 11, wherein the push notification is provided to the computing device at the same time the secured data is provided to the server.

13. The method of claim 11, wherein an amount of secured data hosted in the server exceeds a maximum amount of data allowed for the push notification.

14. The method of claim 11, wherein the URL information is encrypted and is protected with credentials different from credentials required for the mobile device to access the secured data directly from SMA.

15. The method of claim 11, wherein the data hosted in the server includes graphics, diagnostic information, field data, usage analytics and/or detailed log information.

16. The method of claim 15, wherein the push notification triggers a purpose-specific application, which is separate from a primary mobile application for access to the SMA, for accessing the secured data stored in the server using the URL information.

17. The method of claim 11, wherein the server is a push server which also sends the push notification to the computing device of the user.

18. A system management appliance (SMA) hosted in a secure server, the SMA configured to:
provide secure data to a semi-secure server; and
provide a user with a push notification advising the user of an event, the push notification including temporary access information to the secured data, related to the event and stored by the SMA in the semi-secure server, without giving the user authorization to access the full system management software in the SMA and without requiring the use to provide credentials otherwise necessary to obtain the secured data directly from the SMA stored in the secure server, wherein the temporary access information comprises a universal resource locator (URL) comprising a link to the secured data for temporary access to the secured data, wherein the secured data is temporarily stored in the server, and the push notification allows the user to obtain the secured data from the server while avoiding firewalls around the SMA in the secure server.

19. The SMA of claim 18, wherein the semi-secure server comprises a third party server separate from a push server which provides the push notification and the temporary access information, and wherein the temporary access information comprises a temporary URL.

* * * * *